(12) United States Patent
Meng et al.

(10) Patent No.: US 11,851,017 B2
(45) Date of Patent: Dec. 26, 2023

(54) AIRBAG AND VEHICLE

(71) Applicant: Autoliv Development AB, Vargarda (SE)

(72) Inventors: Qiang Meng, Shanghai (CN); Ting Wang, Shanghai (CN)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/755,068

(22) PCT Filed: Sep. 15, 2020

(86) PCT No.: PCT/CN2020/115400
§ 371 (c)(1),
(2) Date: Apr. 20, 2022

(87) PCT Pub. No.: WO2021/077946
PCT Pub. Date: Apr. 29, 2021

(65) Prior Publication Data
US 2022/0388467 A1 Dec. 8, 2022

(30) Foreign Application Priority Data

Oct. 25, 2019 (CN) .......................... 201911021008.5

(51) Int. Cl.
*B60R 21/205* (2011.01)
*B60R 21/231* (2011.01)
(Continued)

(52) U.S. Cl.
CPC .......... *B60R 21/205* (2013.01); *B60R 21/231* (2013.01); *B60R 2021/23382* (2013.01); *B60R 2021/23509* (2013.01)

(58) Field of Classification Search
CPC ... B60R 21/205; B60R 21/231; B60R 21/203; B60R 21/235; B60R 21/2338;
(Continued)

(56) References Cited

U.S. PATENT DOCUMENTS 5,114,181 A 5/1992 Songer
7,841,622 B2 * 11/2010 Pausch ................ B60R 21/2338
280/743.2
(Continued)

FOREIGN PATENT DOCUMENTS

CN 202038265 U 11/2011
CN 102849017 A 1/2013
(Continued)

*Primary Examiner* — Keith J Frisby
(74) *Attorney, Agent, or Firm* — Foley & Lardner LLP

(57) ABSTRACT

A safety airbag having an air bag, the air bag configured with an inflated state and a stowed state, and including a main body portion and a first side flap and a second side flap connected to two sides of the main body portion. The first side flap and the second side flap extend from the main body portion towards an occupant when the air bag is in the inflated state such that the head of the occupant is accommodated in a recessed portion between the first side flap and the second side flap. The first side flap includes a first inner side surface and a first outer side surface. The second side flap includes a second inner side surface and a second outer side surface.

14 Claims, 1 Drawing Sheet

(51) Int. Cl.
*B60R 21/2338* (2011.01)
*B60R 21/235* (2006.01)

(58) Field of Classification Search
CPC ........... B60R 2021/23509; B60R 2021/23533; B60R 2021/23382
See application file for complete search history.

(56) References Cited

U.S. PATENT DOCUMENTS

| | | | |
|---|---|---|---|
| 2010/0007124 A1* | 1/2010 | Fischer | B60R 21/233 280/743.1 |
| 2018/0001863 A1* | 1/2018 | Nakanishi | B60R 21/203 |
| 2018/0111581 A1* | 4/2018 | Wang | B60R 21/2338 |

FOREIGN PATENT DOCUMENTS

| | | |
|---|---|---|
| CN | 106696883 A | 5/2017 |
| CN | 107031557 A | 8/2017 |
| JP | 2008126714 A | 6/2008 |

\* cited by examiner

AIRBAG AND VEHICLE

TECHNICAL FIELD

The present invention relates to a safety device in a vehicle, and relates in particular to a safety airbag and a vehicle including the safety airbag.

BACKGROUND

Safety airbags are widely used in existing vehicles as safety devices for protecting occupants. A safety airbag is, for example, a safety airbag arranged in a steering wheel, a safety airbag arranged in a dashboard, or an overhead safety airbag arranged at the top of a vehicle. When a vehicle is hit or impacted, a gas generator of a safety airbag receives a signal transmitted by means of a wire harness connected to the gas generator so as to ignite a propellant. Then, gas generated by the burning propellant rapidly inflates a stowed air bag of the safety airbag, and the inflated air bag expands to protect an occupant from injury during a collision.

However, during the collision, the head and the chest of the occupant may slide off from the air bag of the safety airbag. Therefore, the head and the chest of the occupant are no longer located within a protection region of the air bag of the safety airbag, and instead hit other structures in the vehicle and thus get injured. As a result, the existing safety airbags cannot guarantee that the occupant is located within the protection region of the air bag during a collision, and thus have low reliability and poor safety.

Therefore, a safety airbag having high reliability and good safety is desired.

SUMMARY

The objective of the present invention is to provide a safety airbag having high reliability and good safety. In addition, the safety airbag according to the present invention has a simple structure and low manufacturing costs.

Provided in an aspect of the present invention is a safety airbag, comprising:

an air bag having an inflated state and a stowed state, and comprising a main body portion and a first side flap and a second side flap connected to two sides of the main body portion. The first side flap and the second side flap extend from the main body portion towards an occupant when the air bag is in the inflated state, such that the head of the occupant is accommodated in a recessed portion between the first side flap and the second side flap.

The first side flap comprises a first inner side surface and a first outer side surface. The second side flap comprises a second inner side surface and a second outer side surface. An edge of the first inner side surface and an edge of the second inner side surface adjacent to each other are connected to each other. The first inner side surface and the second inner side surface are used to define the recessed portion between the first side flap and the second side flap when the air bag is in the inflated state.

According to an embodiment of the present invention, the first side flap and the second side flap are configured to be identical to each other and to be in fluid communication with the main body portion.

According to an embodiment of the present invention, the first side flap and the second side flap are configured to, when in the inflated state, gradually narrow in a direction away from the main body portion so as to respectively form a first lobe and a second lobe.

According to an embodiment of the present invention, when in the inflated state, the main body portion comprises a front side surface opposite to both of the first side flap and the second side flap, and a gas generator for inflating the air bag is provided at the front side surface.

According to an embodiment of the present invention, a drawstring is further included. One end of the drawstring is configured to be connected to the front side surface, and the other end of the drawstring is configured to be connected to a portion of the main body portion close to the recessed portion.

According to an embodiment of the present invention, at least a portion of the main body portion, the first side flap, and the second side flap are configured to be made from the same piece of fabric.

According to an embodiment of the present invention, the same piece of fabric is configured to, when in the inflated state, comprise a rectangular first section and two triangular second sections located on a first side edge of the first section. The first section is used to form the main body portion, and the two second sections are respectively used to form the first side flap and the second side flap.

According to an embodiment of the present invention, the front side surface is configured to be connected to a second side edge of the same piece of fabric opposite to the first side edge.

According to an embodiment of the present invention, the same piece of fabric is configured to, when in the inflated state, comprise two triangular third sections located on the second side edge of the first section. The third sections are configured to be connected to the front side surface.

Provided in another aspect of the present invention is a vehicle comprising the safety airbag according to any of the aforementioned descriptions, and the safety airbag is configured to be installed in a dashboard of the vehicle.

DETAILED DESCRIPTION

Specific implementation manners of the safety airbag and the vehicle according to the present invention will be described below with reference to the accompanying drawings. The following detailed description and accompanying drawings serve to exemplarily illustrate the principles of the present invention. The present invention is not limited to the described preferred embodiments, and the scope of protection of the present invention is defined by the claims.

It should be noted that the safety airbag of the present invention is applicable to a vehicle. As an example, the safety airbag of the present invention may be installed in a dashboard of the vehicle.

Figure 1:
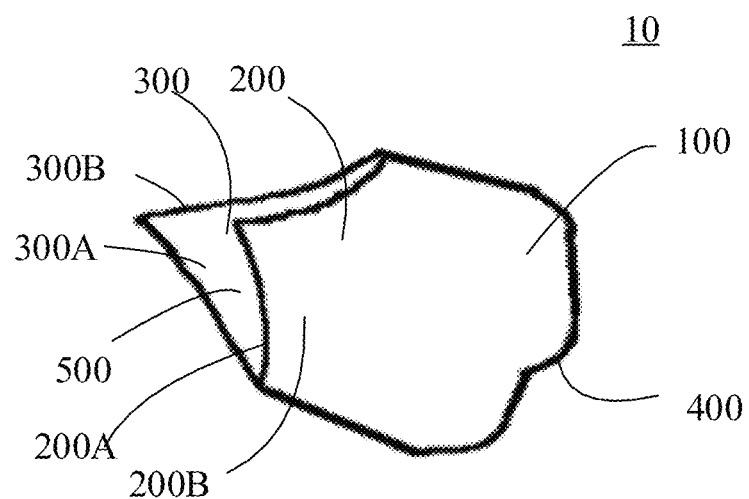
FIG. 1 shows a safety airbag according to an embodiment of the present invention.

FIG. 1 shows the safety airbag according to an embodiment of the present invention. The safety airbag according to an embodiment of the present invention is described below with reference to FIG. 1.

As shown in FIG. 1, the safety airbag according to an embodiment of the present invention includes an air bag 10 and a gas generator (not shown). The air bag 10 has an inflated state and a stowed state, and the gas generator is used to inflate the air bag 10 so as to enable the air bag 10 to expand and enter the inflated state. In order to clearly illustrate the structure of the air bag 10, the air bag 10 shown in FIG. 1 is in the inflated state, and the left side of the air bag 10 shown in FIG. 1 faces an occupant when in use.

Continuing to refer to FIG. 1, it can be seen from the air bag 10 in the inflated state shown in FIG. 1 that the air bag 10 includes a main body portion 100 and a first side flap 200 and a second side flap 300 connected to two sides of the main body portion 100, and that the main body portion 100 includes a front side surface 400 opposite to both of the first side flap 200 and the second side flap 300. That is, both of the first side flap 200 and the second side flap 300 are located on the left side of the main body portion 100, and the front side surface 400 is located on the right side of the main body portion 100. In addition, the gas generator for inflating the air bag 10 may be provided at the front side surface 400. When the air bag 10 is in the inflated state as shown in FIG. 1, the first side flap 200 and the second side flap 300 extend from the main body portion 100 towards an occupant, such that the head of the occupant is accommodated in a recessed portion 500 between the first side flap 200 and the second side flap 300. Further, the first side flap 200 includes a first inner side surface 200A and a first outer side surface 200B, and the second side flap 300 includes a second inner side surface 300A and a second outer side surface 300B. In addition, an edge of the first inner side surface 200A and an edge of the second inner side surface 300A adjacent to each other are connected to each other. When the air bag 10 is in the inflated state, the first inner side surface 200A and the second inner side surface 300A are used to define the recessed portion 500 between the first side flap 200 and the second side flap 300. In addition, the first side flap 200 and the second side flap 300 are configured to, when in the inflated state, gradually narrow in a direction away from the main body portion 100 so as to respectively form a first lobe and a second lobe.

When the aforementioned safety airbag is installed, for example, in a dashboard to protect a front occupant, the head of the occupant basically moves synchronously with the vehicle before a collision event. During the collision event, a traveling direction and speed of the vehicle may change drastically and suddenly. When such collision triggers the safety airbag to inflate the air bag, the air bag accelerates in a specific direction of the vehicle. That is, the air bag expands backwards from the dashboard. Since the collision event has changed the traveling direction of the vehicle, the occupant may no longer move synchronously with the vehicle even if the occupant is restrained by a modern three-point safety belt. In addition, the occupant may be harmed to a certain extent when hitting the air bag of the safety airbag. For example, hitting the air bag of the safety airbag may cause the head of the occupant to rotate in an accelerated manner relative to the spine. Such rotational acceleration or deceleration may cause injury to the occupant. In other words, when the occupant hits the air bag of the safety airbag, the head of the occupant may rotate or twist significantly, and this can cause injury. For example, when the front occupant, during a collision event, moves in a forward direction and hits the air bag of the safety airbag, the head of the occupant may rotate about a longitudinal axis of the head with considerable force. Therefore, a safety airbag needs to have the function of reducing the rotational speed of the head of the occupant during a collision event so as to reduce the risk of a traumatic head/brain injury caused by rapid rotation of the head of the occupant. The safety airbag of the present invention has the aforementioned function, which will be described in detail below.

As shown in FIG. 1, in the air bag 10 of the safety airbag of the present invention, a low fabric tension region and a high fabric tension region are formed in the recessed portion 500. Specifically, the low fabric tension region is located on the adjacent edges of the first inner side surface 200A and the second inner side surface 300A of the air bag 10, and the high fabric tension region is located on respective portions (for example, respective tip portions of the lobes) of the first side flap 200 and the second side flap 300 located away from the main body portion 100. The low fabric tension region can reduce the probability that the air bag 10 causes the head of the occupant to rotate. The high fabric tension region provides support so as to prevent or restrain the occupant from moving out of the first side flap 200 or the second side flap 300. Therefore, in the safety airbag of the present invention, the recessed portion formed between the first side flap and the second side flap can accommodate the head of the occupant and provide support to side surfaces of the head so as to counteract a force on the head that may cause the head to rotate clockwise or counterclockwise about the longitudinal axis of the head.

Therefore, the safety airbag of the present invention can ensure that the occupant remains in a protection region of the air bag during a collision, and can reduce the risk of a traumatic head/brain injury caused by rapid rotation of the head of the occupant, thereby achieving high reliability and good safety. In addition, in the safety airbag of the present invention, the two side flaps extending from two sides of the main body portion form the recessed portion of the air bag so as to achieve the objective of protecting the head of the occupant during a collision. Therefore, the safety airbag of the present invention is further characterized by a simple structure and low manufacturing costs.

Figure 2:
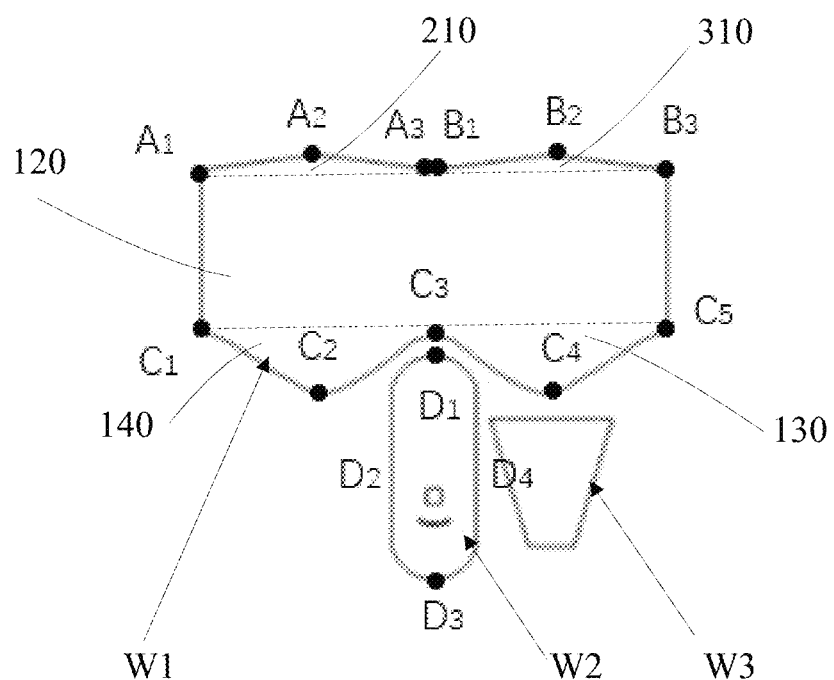
FIG. 2 shows a method for manufacturing the safety airbag according to an embodiment of the present invention.

FIG. 2 shows a method for manufacturing the safety airbag according to an embodiment of the present invention. The method for manufacturing the safety airbag according to an embodiment of the present invention is described below with reference to FIG. 2. It should be noted that the air bag 10 of the safety airbag shown in FIG. 1 can be manufactured by using the manufacturing method described with reference to FIG. 2. However, air bags manufactured by the manufacturing method described below with reference to FIG. 2 are not limited to the air bag 10 of the safety airbag shown in FIG. 1.

As shown in FIG. 2, three pieces of fabric are provided, that is, a first piece of fabric W1, a second piece of fabric W2, and a third piece of fabric W3. The first piece of fabric W1 in the inflated state is configured to include a rectangular first section 120, and two triangular second sections 210 and 310 located on a first side edge (namely an upper side edge) of the first section 120. The first section 120 is used to form a portion of the main body portion, and the two second sections 210 and 310 are respectively used to form the first side flap and the second side flap. In addition, the first piece of fabric W1 in the inflated state is configured to include two triangular third sections 130 and 140 located on a second side edge of the first section 120, and the third sections 130 and 140 are configured to be connected to the front side surface. In addition, the second piece of fabric W2 is configured to form the front side surface. The front side surface is configured to be connected to the second side edge (namely a lower side edge) of the first piece of fabric W1 opposite to the first side edge (namely the upper side edge). The third piece of fabric W3 is configured to form a drawstring.

The method for manufacturing the air bag of the safety airbag of the present invention includes:

marking the upper side edge of the first piece of fabric W1 with six feature points A1, A2, A3, B1, B2, and B3, wherein point A3 and point B1 coincide with each other;

marking the lower side edge of the first piece of fabric W1 with five feature points C1, C2, C3, C4, and C5;

marking the second piece of fabric W2 with four feature points D1, D2, D3, and D4;

causing point A1 and point A3 to coincide with each other, and performing folding to connect (for example, by means of stitching or bonding) edge line A1A2 and edge line A2A3 to each other;

causing point B1 and point B3 to coincide with each other, and performing folding to connect (for example, by means of stitching or bonding) edge line B1B2 and edge line B2B3 to each other;

connecting one end of the third piece of fabric W3 to a portion of the main body portion close to the recessed portion;

performing folding to connect (for example, by means of stitching or bonding) edge line A1C1 and edge line B3C5 to each other; and connecting (for example, by means of stitching or bonding) curve C1C2C3 and curve D1D2D3 to each other, connecting the other end of the third piece of fabric W3 to the front side surface, and connecting (for example, by means of stitching or bonding) curve C3C4C5 and curve D1D4D3 to each other.

It should be noted that the aforementioned method for manufacturing the air bag of the safety airbag of the present invention is merely an example, and those skilled in the art could adjust the sequence of the steps or even delete the steps of the aforementioned method according to actual requirements.

As a preferred embodiment of the present invention, the first side flap and the second side flap are configured to be identical to each other and to be in fluid communication with the main body portion. This preferred embodiment has a simple structure and is easy to manufacture. However, this is merely an example, and the safety airbag of the present invention is not limited thereto. For example, according to actual requirements, those skilled in the art could configure the first side flap and the second side flap to be different from each other and/or configure at least one of the first side flap and the second side flap to be not in fluid communication with the main body portion, and correspondingly provide a separate gas generator for the at least one of the first side flap and the second side flap not in fluid communication with the main body portion.

As a preferred embodiment of the present invention, the air bag includes a drawstring. One end of the drawstring is configured to be connected to the front side surface, and the other end of the drawstring is configured to be connected to a portion of the main body portion close to the recessed portion. In this embodiment, the thickness and the shape of the air bag can be better controlled by means of the drawstring. However, this is merely an example, and the safety airbag of the present invention is not limited thereto. For example, those skilled in the art might not provide any drawstring according to actual requirements.

According to a preferred embodiment of the present invention, at least a portion of the main body portion, the first side flap, and the second side flap are configured to be made from the same piece of fabric. This embodiment has low manufacturing costs and a simple structure. However, this is merely an example, and the safety airbag of the present invention is not limited thereto. For example, those skilled in the art could select the number of pieces of fabric according to actual requirements. In addition, in the safety airbag of the present invention, the air bag is not limited by the feature of the front side surface. For example, according to actual requirements, those skilled in the art could modify the method for manufacturing the main body portion so that curve C1C2C3 and curve C3C4C5 of the first piece of fabric W1 shown in FIG. 2 are connected (for example, by means of stitching or bonding) to each other.

As described above, although the exemplary embodiments of the present invention have been described in the specification with reference to the accompanying drawings, the present invention is not limited to the aforementioned specific implementation manners, and the scope of protection of the present invention should be defined by the claims and equivalent meanings thereof.

The invention claimed is:

1. A safety airbag, comprising:
an air bag having an inflated state and a stowed state, and comprising a main body portion and a first side flap and a second side flap connected to two sides of the main body portion, wherein the first side flap and the second side flap are configured to extend from the main body portion towards an occupant when the air bag is in the inflated state such that the airbag is configured to accommodate a head of the occupant in a recessed portion between the first side flap and the second side flap;
the first side flap comprises a first inner side surface and a first outer side surface, the second side flap comprises a second inner side surface and a second outer side surface, an edge of the first inner side surface and an edge of the second inner side surface adjacent to each other are connected to each other, and the first inner side surface and the second inner side surface are used to define the recessed portion between the first side flap and the second side flap when the air bag is in the inflated state, wherein the first side flap, the second side flap, and a portion of the main body portion are a same piece of fabric, and wherein the same piece of fabric is configured to, when in the inflated state, comprise a rectangular first section and two triangular second sections located on a first side edge of the first section, the first section is used to form the main body portion, and the two second sections are respectively used to form the first side flap and the second side flap.

2. The safety airbag according to claim 1, wherein the first side flap and the second side flap are configured to be identical to each other and to be in fluid communication with the main body portion.

3. The safety airbag according to claim 2, wherein the first side flap and the second side flap are configured to, when in the inflated state, gradually narrow in a direction away from the main body portion so as to respectively form a first lobe and a second lobe.

4. The safety airbag according to claim 3, wherein when in the inflated state, the main body portion comprises a front side surface opposite to both of the first side flap and the second side flap.

5. The safety airbag according to claim 4 further comprising a drawstring, one end of the drawstring being configured to be connected to the front side surface, and the other end of the drawstring being configured to be connected to a portion of the main body portion close to the recessed portion.

6. The safety airbag according to claim 1, wherein the front side surface is configured to be connected to a second side edge of the same piece of fabric opposite to the first side edge.

7. The safety airbag according to claim 6, wherein the same piece of fabric is configured to, when in the inflated state, comprise two triangular third sections located on the second side edge of the first section, and the third sections are configured to be connected to the front side surface.

8. A vehicle, comprising the safety airbag according to claim 1, wherein the safety airbag is configured to be installed in a dashboard of the vehicle.

9. The vehicle according to claim 8, wherein the first side flap and the second side flap are configured to be identical to each other and to be in fluid communication with the main body portion.

10. The vehicle according to claim 9, wherein the first side flap and the second side flap are configured to, when in the inflated state, gradually narrow in a direction away from the main body portion so as to respectively form a first lobe and a second lobe.

11. The vehicle according to claim 10, wherein when in the inflated state, the main body portion comprises a front side surface opposite to both of the first side flap and the second side flap.

12. The vehicle according to claim 11, wherein the safety airbag further comprises a drawstring, one end of the drawstring is configured to be connected to the front side surface, and the other end of the drawstring is configured to be connected to a portion of the main body portion close to the recessed portion.

13. The vehicle according to claim 8, wherein the front side surface is configured to be connected to a second side edge of the same piece of fabric opposite to the first side edge.

14. The vehicle according to claim 13, wherein the same piece of fabric is configured to, when in the inflated state, comprise two triangular third sections located on the second side edge of the first section, and the third sections are configured to be connected to the front side surface.

* * * * *